United States Patent
Haese et al.

(10) Patent No.: US 6,899,939 B2
(45) Date of Patent: May 31, 2005

(54) POLYMER MIXTURES

(75) Inventors: Wilfried Haese, Odenthal (DE); James Mason, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/104,748

(22) Filed: Mar. 22, 2002

(65) Prior Publication Data

US 2002/0173566 A1 Nov. 21, 2002

(30) Foreign Application Priority Data

Mar. 26, 2001 (DE) .......................... 101 14 803

(51) Int. Cl.$^7$ .......................... C08K 5/52; C08K 5/103; C08L 69/00
(52) U.S. Cl. .................. 428/64.7; 524/108; 524/117; 524/120; 524/310; 524/317
(58) Field of Search .................. 428/64.7; 524/108, 524/117, 120, 310, 317

(56) References Cited

U.S. PATENT DOCUMENTS

| | | | |
|---|---|---|---|
| 4,762,873 A | | 8/1988 | Miyauchi et al. ........... 524/128 |
| 5,244,954 A | * | 9/1993 | Fasulo |
| 6,310,220 B1 | | 10/2001 | Schmitter et al. ........... 549/307 |
| 6,407,199 B1 | | 6/2002 | Hirata et al. ................ 528/196 |
| 6,492,485 B1 | * | 12/2002 | Gohr |

FOREIGN PATENT DOCUMENTS

| | | |
|---|---|---|
| DE | 199 25 125 | 12/2000 |
| EP | 0 492 550 | 7/1992 |
| EP | 0 718 367 | 6/1996 |
| EP | 0947 538 | 10/1999 |
| JP | 62-184639 | 8/1987 |
| JP | 2000-80261 | 3/2000 |
| JP | 2000-239510 * | 9/2000 |
| JP | 2000-239511 * | 9/2000 |
| WO | 00/26287 * | 5/2000 |
| WO | 01/77206 | 10/2001 |

OTHER PUBLICATIONS

Chemical Abstract of JP2000239510.*
Chemical Abstract of JP2000239511.*
Chemical Abstract Registry No. 80693–00–1.*
Database WPI Section Ch, Week 199816 Derwent Publications Ltd., London, GB; AN 1998–175115 XP002210622 & JP 10 036645 A (Polyplastics KK), Feb. 10, 1998 Zusammenfassung.

* cited by examiner

Primary Examiner—David J. Buttner
(74) Attorney, Agent, or Firm—Joseph C. Gil; Aron Preis

(57) ABSTRACT

A thermoplastic molding composition especially suitable for preparing optical data carriers is disclosed. The composition contains polycarbonate resin, at least one mold release agent and at least one phosphite having a defined structural formula. The optical data carriers include compact discs, video discs, digital versatile discs and further optical data carriers which may be written and erased one or more times.

5 Claims, No Drawings

POLYMER MIXTURES

FIELD OF THE INVENTION

The application relates to new thermoplastic polymer mixtures containing polycarbonate, mold release agents and specific phosphites and to the use of these polymer mixtures for producing shaped articles, in particular optical data carriers such as compact discs, video discs, digital versatile discs and further optical data carriers which may be written and erased one or more times, and to the shaped articles produced therefrom themselves, see above.

SUMMARY OF THE INVENTION

A thermoplastic molding composition especially suitable for preparing optical data carriers is disclosed. The composition contains polycarbonate resin, at least one mold release agent and at least one phosphite having a defined structural formula. The optical data carriers include compact discs, video discs, digital versatile discs and further optical data carriers which may be written and erased one or more times.

BACKGROUND OF THE INVENTION

Polycarbonates are generally used as materials for the injection molding or the injection-pressure molding of optical data carriers on account of their particular combination of properties such as transparency, heat resistance and dimensional stability. To improve processability, which generally takes place at temperatures in the range of 300° C. to 400° C., additives such as mold release agents and stabilisers are added to the polycarbonate.

Aliphatic fatty acid esters of polyhydric alcohols, for example esters of glycerine with long-chain fatty acids and of pentaerythritol with long-chain fatty acids are preferably used as mold release agents. These esters may also be partially esterified in which case they possess free OH groups which are obviously advantageous for the mold release action, but these esters impair the heat stability of the mixture so it is necessary to add stabilisers. However, this stabiliser must be very effective, i.e. must be effective in very low concentrations as there is otherwise the risk of coating formation in the mold. In this case, the molds and dies often have to be cleaned during processing, and this is detrimental and leads to sheets of inferior quality. Completely esterified mold release agents, on the other hand, have higher stability, but the mold release action of these esters at low concentrations is much weaker than that of esters with free OH groups. Therefore, greater quantities of completely esterified mold release agents generally have to be used, and this increases the risk of coating formation but, on the other hand, the amount of stabiliser added may be somewhat smaller.

A plurality of mixtures have already been proposed in the literature, such as:

For stabilising mixtures containing mold release agents with OH groups, EP-A 205 192 teaches the use of mixtures of trimethyl phosphate and/or triethyl phosphate combined with phosphites. Accordingly, the stabilising effect of the phosphoric acid esters or the phosphites alone is inadequate and these phosphoric acid esters are ecologically undesirable.

JP-A 62184639 describes optical data memories produced from polycarbonate stabilised with phosphites. Readily volatile phosphites such as trimethyl phosphite, which are ecologically undesirable and critical for coating formation are preferred.

JP-A 2000080261 describes polycarbonate mixtures with mold release agents, tris(di-tert-butyl-phenyl)phosphites and phosphoric acid. Accordingly, the stabilising effect of the phosphite is inadequate, so phosphoric acid is used as further stabiliser, but it can cause corrosion of the memory layers on the optical data carriers under conditions of high atmospheric humidity and elevated temperature.

It was accordingly the object to develop thermoplastic polymer mixtures containing polycarbonate, mold release agents and heat stabiliser, which are optimised for the production of optical data carriers and other shaped articles, in other words, for example, have good mold release action in smaller quantities. In particular, the new disc format with higher storage capacity and optionally thinner discs such as digital versatile discs (DVDs) demands higher heat stability than CDs. Damage to material during processing to shaped articles and coating formation in the mold become more critical.

With the mixtures according to the invention, this object is surprisingly achieved by improved quality of the data memories and improved processibility of the material during injection molding or injection pressure molding.

DETAILED DESCRIPTION OF THE INVENTION

The present application accordingly relates to thermoplastic polymer mixtures containing at least one polycarbonate, at least one mold release agent and at least one phosphite with a specific chemical structure. These phosphites stabilise the mold release agent present, even in low concentrations, and therefore allow lower metering of the mold release agents with the same mold release action. Coating formation is therefore reduced to a surprisingly low level owing to both the reduced use of mold release agents and also their surprisingly increased stability.

The invention also relates to the use of these polymer mixtures for producing optical data carriers such as compact discs, video discs, digital versatile discs and other optical data carriers which may be written or erased one or more times, and to the optical data carriers produced from the polymer mixtures themselves.

The polymer mixture may obviously also be used for other traditional polycarbonate applications, including those using a polycarbonate with a higher molecular weight. The applications may be transparent or opaque such as food and beverage packaging, optical lenses and prisms, lenses for lighting purposes, automotive headlight lenses, glazing for construction and motor vehicles, glazing of different types, such as for greenhouses, so-called twin wall sheets or hollow chamber sheets. Other examples of applications are profiles, films, housing parts of any type, for example for medical instruments, domestic appliances such as juice presses, coffee machines, mixers; for office machines such as computers, monitors, printers, copiers; for sheets, pipes, electrical installation ducts, windows, doors and profiles for the building industry, interior finishings and external applications; in the field of electrical engineering, for example for switches and plugs. The shaped articles according to the invention may also be used for interior finishings and components of rail vehicles, ships, aircrafts, buses and other motor vehicles and for truck body parts.

Thermoplastic polymer mixtures in the context of the present invention contain predominantly aromatic polycarbonates. The term polycarbonates covers both homopolycarbonates and copolycarbonates; the polycarbonates may be linear or branched in a known manner. They have a molecular weight average determined by gel permeation chromatography of 5,000 to 80,000, preferably 10,000 to 40,000. The molecular weight is particularly preferably between 15,000 and 35,000, in particular 15,000 and 22,000.

These polycarbonates are produced in a known manner from diphenols, carbonic acid derivates, optionally chain terminators and optionally branching agents.

Details concerning the production of polycarbonates have been set down in many patents over about 40 years. Reference is made here merely by way of example to Schnell, "Chemistry and Physics of Polycarbonates", Polymer Reviews, Volume 9, Interscience Publishers, New York, London, Sydney 1964, to Dr. Freitag, U. Grigo, P. R. Müller, H. Nouvertne', BAYER AG, "Polycarbonates" in Encyclopedia of Polymer Science and Engineering, Volume 11, Second Edition, 1988, pages 648–718 and finally Dres. U. Grigo, K. Kirchner and P. R. Müller "Polycarbonate" in Becker/Braun, Kunststoff-Handbuch, Vol. 3/1, Polycarbonate, Polyacetale, Polyester, Celluloseester, Carl Hanser Verlag, Munich, Vienna 1992, pages 117–299.

Diphenols suitable for producing the polycarbonates include, for example, hydroquinone, resorcinol, dihydroxyiphenyls, bis-(hydroxyphenyl)-alkanes, bis(hydroxyphenyl)-cycloalkanes, bis-(hydroxylphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, α-α'-bis-(hydroxyphenyl)-diisopropylbenzenes, and nuclear-alkylated and ring-halogenated compounds.

Preferred phenols include 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroyphenyl)-methane, 2,2-bis-(3,5-dimethyl-4-hydroxyphenyl)-propane, bis-(3,5-dimethyl-4-hydroxyphenyl)-sulphon, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-3,3,5-trimethylcyclohexane and 4,4'-(m-phenylenediisopropylidene)-diphenol.

Particularly preferred diphenols include 2,2-bis-(4-hydroxyphenyl)-propane (BPA), 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 4,4'-(m-phenyllendiisopropylidene) bisphenol (CAS-No. 13595-25-0) (BPM), 1,1-bis-(4-hydroxyphenyl)-cyclohexane and 1,1-bis-(4-hydroxyphenyl)-3,3,5-trimethylcyclohexane (TMC).

These and further suitable diphenols are described, for example, in U.S. Pat. Nos. 3,028,635, 2,999,835, 3,148,172, 2,991,273, 3,271,367, 4,982,014 and 2,999,846, in DE-A 1 570 703, 2 063 050, 2 036 052, 2 211 956 and 3 832 396, French Patent 1 561 518, the monograph "H. Schnell, Chemistry and Physics of Polycarbonates, Interscience Publishers, New York 1964" and in JP-A 62039/1986, 62040/1986 and 105550/1986.

Only one diphenol is used in the case of homopolycarbonates and a plurality of diphenols in the case of copolycarbonates.

Polymer mixtures containing at least one polycarbonate with diol units consisting of BPA and/or trimethylcyclohexyl-bisphenol (TMC), preferably selected from the group comprising homopolymers of BPA, copolymers of BPA with TMC or copolymers with 5 to 60 wt. % TMC are preferably used.

Suitable carbonic acid derivatives include, for example, phosgene or diphenylcarbonate.

Suitable chain terminators include monophenols as well as moncarboxylic acids. Suitable monophenols include phenol itself, alkyl phenols such as cresols, p-tert.-butyl-phenol, p-n-octylphenol, p-iso-octylphenol, p-n-nonylphenol and p-iso-nonylphenol, p-cumylphenol, halogen phenols such as p-chlorophenol, 2,4-dichlorophenol, p-bromophenol amylphenol and 2,4,6-tribromophenol and mixtures thereof.

Preferred chain terminators are the phenols of formula (I)

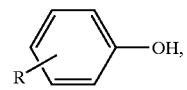

(I)

wherein
R represents hydrogen, tert.-butyl or a branched or unbranched $C_8$ and/or $C_9$ alkyl radical. However, p-cumylphenol may also preferably be used. In the case of the transesterification process, the chain terminator results from the diaryl carbonate used.

The quantity of chain terminator to be used, preferably in the phase interface process, is 0.1 mol % to 5 mol % based on mol of respectively used diphenols. The chain terminators may be used before, during or after phosgenation.

Suitable branching agents are the trifunctional or higher than trifunctional compounds known from polycarbonate chemistry, in particular those with three or more than three phenolic OH groups.

Suitable branching agents include, for example, phloroglucine, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)-phenyl)-orthoterephthalic acid ester, tetra-(4-hydroxyphenyl)-methane, tetra-(4-(4-hydroxyphenyl-isopropyl)-phenoxy)-methane and 1,4-bis-(4',4"-dihydroxytriphenyl)-methyl)-benzene as well as 2,4-dihydroxybenzoic acid, trimesic acid, cyanuric chloride and, for some applications, even preferably 3,3-bis-(3-methyl-4-hydroxy-phenyl)-2-oxo-2,3-dihydroindol.

The quantity of branching agents optionally used is 0.01 mol % to 2 mol %, again based on mol of respectively used diphenols.

The branching agents may be presented either with the diphenols and the chain terminators in the aqueous alkaline phase in the phase interface process or may be added, dissolved in an organic solvent. In the case of the transesterification process, the branching agents may be used together with the diphenols.

A person skilled in the art is familiar with all these methods of producing thermoplastic polycarbonates.

The compounds used as mold release agent are preferably esters of polyhydric alcohols with long-chain carboxylic acids. Mold release agents which have not been completely esterified and therefore have free OH groups are preferred. (Partial) esters of saturated monovalent fatty acids with 16 to 22 carbon atoms with glycerine, trimethylol propane, pentaerythritol or similar polyhydric alcohols are particularly preferred. In particular, glycerine monostearate and glycerine monopalmiate.

These saturated monovalent fatty acid esters of glycerine are used alone or as mixtures with two or more components. The saturated monoesters of glycerine are usually produced by transesterification of hydrogenated animal or vegetable oil with glycerine. Although the reaction product can also contain esters other than the glycerine esters, it is used as mold release agent according to the invention. For example, the mixture can contain small or greater proportions of diglycerides and triglycerides.

The optimum amount of mold release agent during the production of CDs and other optical storage media (DVDs etc.) is determined on the one hand by an adequate mold-releasing action and on the other hand by coating formation on the mold. Conventionally used concentrations lie between 50 and 1,000 ppm, more advantageously between 100 and 500 ppm of mold release agent. For the other applications of polycarbonate, the concentrations are 100 to 10,000 ppm, preferably 2,000 to 7,000 ppm.

The special phosphites according to the invention are those which possess both aromatic and aliphatic radicals in a molecule. These are compounds having the following structure:

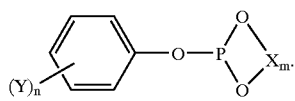

wherein n represents the number 0 to 5, preferably 1 to 3 and quite particularly preferably 3, Y, independently of one another in each case, represents alkyl or optionally substituted aryl, preferably $C_1$–$C_4$ alkyl, particularly preferably methyl, sec.-butyl and tert.-butyl, m represents the number 1 to 3, preferably 3 and X, independently from one another in each case, represents an optionally substituted methylene radical, wherein at least one methylene radical must be completely substituted and the substituents are selected independently of one another from the group comprising $C_1$–$C_{20}$ alkyl, preferably $C_1$–$C_{20}$ alkyl or the two substituents at a completely substituted methylene radical together represent a radical

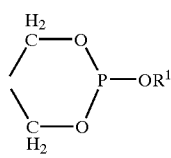

in which $R^1$ are selected from the group comprising $C_1$–$C_{18}$ alkyl, $C_3$–$C_{12}$ cycloalkyl, $C_6$–$C_{30}$ alkaryl and aryl, wherein these radicals may in turn be substituted by 1 to 4 O-alkylene-O and/or carboxylic acid ester-COO-radicals; $C_2$–$C_{18}$ polyhydroxyalkyl containing 2 to 10 hydroxyl groups; $C_2$–$C_{18}$ polyphenyl radicals containing 2 to 10 phenolic OH groups.

Preferred compounds are those of formula

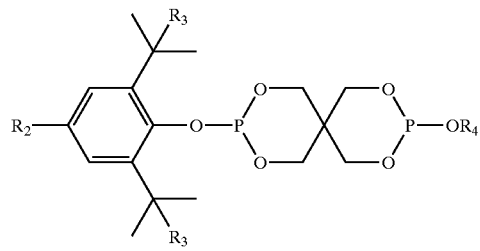

in which $R_2$ represents $C_1$–$C_6$ alkyl;

$R_3$ represents methyl or ethyl and $R_4$ are selected from the group comprising $C_1$–$C_{18}$ alkyl, $C_3$–$C_{12}$ cycloalkyl, $C_6$–$C_{30}$ alkaryl and aryl, wherein these radicals may in turn be substituted by 1 to 4 O-alkylene-O and/or carboxylic acid ester-COO-radicals; $C_2$–$C_{18}$ polyhydroxyalkyl containing 2 to 10 hydroxyl groups; $C_2$–$C_{18}$ polyphenyl radicals containing 2 to 10 phenolic OH groups.

Also preferred are compounds of formula

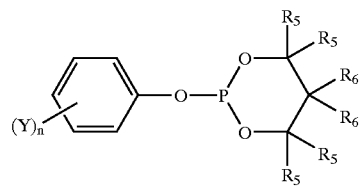

wherein

Y and n have the aforementioned meanings and $R_5$, independently of one another, are selected from the group comprising hydrogen and $C_3$–$C_{20}$ alkyl, at least one $R_5$ preferably representing alkyl, $R_6$ independently of one another represents $C_1$–$C_{10}$ alkyl.

Compounds of formula

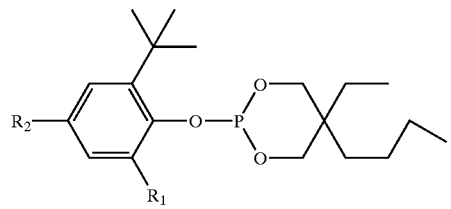

Wherein $R_1$ and $R_2$ represent methyl, sec.-butyl or tert.-butyl are particularly preferred.

Similarly, the compounds defined on pages 16 to 20 of EP A1 0 038 876 and the example mentioned on page 21 of the same document are also particularly preferred.

(2,4,6-tri-t-butylphenyl)-(2-butyl-2-ethyl-propane-1,3-diyl)-phospite having the following structure

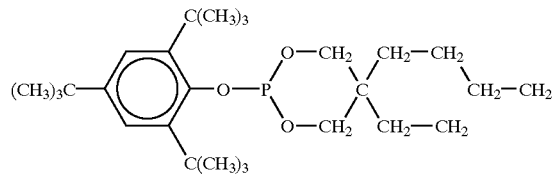

is quite particularly preferred.

The phosphites may be used alone, but also in combination with other phosphorus compounds, wherein the other phosphorus compounds may also be those having a different phosphorus oxidation number. For example, combinations of the phosphites according to the invention with other phosphites, with phosphines, for example triphenylphosphine, with phosphonites, with phosphates, with phosphonates, etc. may accordingly be used.

The phosphites used according to the invention may be produced in a generally known or similarly known manner. (2,4,6-tri-t-butylphenyl)-(2-butyl-2-ethyl-propane-1,3-diyl)-phospite is described, for example, in EP-A 702018 and EP 635514.

The polymer mixtures according to the invention generally contain the phosphorus compound in a proportion of 10 to 5,000 ppm, preferably 10 to 1,000 ppm, particularly preferably 20 to 500 ppm, quite particularly preferably between 50 and 250 ppm.

Compounds carrying the preferred, particularly preferred or quite particularly preferred below-mentioned substituents are preferred, particularly preferred or quite particularly preferred.

However, the definitions of radicals or explanations and parameters or quantitative ratios mentioned generally or in preferred ranges hereinbefore may also be combined with one another as desired, in other words between the respective ranges and preferred ranges.

The release agents and the phosphorus compound are added to the thermoplastic polymer mixtures for example and preferably in that they are added after production and during working up of the polycarbonates, for example by addition to the polycarbonate polymer solution or a melt of the thermoplastic polymer mixtures. Furthermore, it is also possible to add the components independently of one another in various operating stages, for example one of the components during the working up of the polymer solution and the other component(s) in the melt, providing that all components are contained during production of the end products (shaped articles).

The thermoplastic polymer mixtures according to the invention may also contain conventional additives for polycarbonates, in known quantities, such as, for example and preferably, UV radiation stabilisers, fire retardants, dyes, fillers, foaming agents, optical brighteners and antistatics. For optical applications, it is preferable to use components which do not adversely affect the transparency of the material.

These substances may be found in many publications, for example in Additives for Plastics Handbook, John Murphy, 1999 and are commercially available.

1. Suitable Antioxidants Include, for Example:

1.1 Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols, which are linear or branched in the side chain, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol.

1.2 Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3 Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl-stearate, bis(3,5-di-tert-butyl-4-hydroxyphenyl)adipate.

1.4 Tocopherols, for example α-tocopherol, β-tocopherol, γ-tocopherol, δ-tocopherol and mixtures thereof (vitamin E).

1.5 Hydroxylated thiodiphenylethers, for example 2,2'-thiobis(6-tert-butyl-4-methylphenol), 2,2'-thiobis(4-octylphenol), 4,4'-thiobis(6-tert-butyl-3-methyl-phenol), 4,4'-thiobis(6-tert-butyl-2-methylphenol), 4,4'-thiobis(3,6-di-sec-amylphenol, 4,4'-bis(2,6-dimethyl-4-hydroxyphenyl)disulphide.

1.6 Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butyl-phenol), 2,2'-ethylidenebis(4,6-di-tert-butylphenol), 2,2'ethylidenebis(6-tert-butyl-4-isobutyl-phenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol),4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethyleneglycolbis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methyl-phenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane, 1,1,5,5-tetra-(5-tert-butyl-4-hydroxy-2-methylphenyl)-pentane.

1.7 O-, N- and S-benzyl compounds, for example 3,5,3',5'-tetra-tert-butyl-4,4'-dihydroxydibenzylether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithio-terephthalate, bis(3,5-di-tert-butyl-4-hydroxybenzyl)sulphide, isooctyl-3,5-di-tert-butyl-4-hydroxybenzylmercaptoacetate.

1.8 Hydroxybenzylated malonates, for example dioctadecyl-2,2-bis(3,5-di-tert-butyl-2-hydroxybenzyl)malonate, dioctadecyl-2-(3-tert-butyl-4-hydroxy-5-methyl-benzyl)-malonate, didodecylmercaptoethyl-2,2-bis(3,5-di-tertbutyl-4-hydroxybenzyl)-malonate, bis[4-(1,1,3,3-tetramethylbutyl)phenyl]-2,2-bis(3,5-di-tert-butyl-4-hydroxybenzyl)malonate.

1.9 Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)-phenol.

1.10 Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxy-anilino)-1,3,5-triazine, 2-octylmercapto-4,6-bis(3,5-di-tert-butyl-4-hydroxy-phenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropioyl)hexahydro-1,3,5-triazine, 1,3,5-tris(3,5-dicyclohexyl-4-hydroxybenzyl) isocyanurate.

1.11 Acyl amino phenols, for example 4-hydroxylauranilide, 4-hydroxytearanilide, octyl-N-(3,5-di-tert-butyl-4-hydroxyphenyl)carbamate.

1.12 Esters of β-(3,5-di-tert-butyl-4-hydroxyphenyl) propionic acid with mono- or polyhydric alcohols, for example with methanol, ethanol, n-octanol, i-octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, the ester with octadecanol (IRGANOX 1076® manufactured by Ciba Spec.) being quite particularly suitable and preferred.

1.13 Esters of β-(5-tert-butyl-4-hydroxy-3-methylphenyl) propionic acid with mono- or polyhydric alcohols, for example with methanol, ethanol, n-octanol, i-octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14 Esters of β-(3,5-dicyclohexyl-4-hydroxyphenyl) propionic acid with mono- or polyhydric alcohols, for example with methanol, ethanol, octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15 Esters of 3,5-di-tert-butyl-4-hydroxyphenyl acetic acid with mono- or polyhydric alcohols, for example with methanol, ethanol, octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16 Amides of β-(3,5-di-tert-butyl-4-hydroxyphenyl) propionic acid, for example N,N'-bis(3,5-di-tert-butyl-4-hydroxyphenylpropionyl)hexa-methylenediamide, N,N'-bis(3,5-di-tert-butyl-4-hydroxyphenylpropionyl)trimethylenediamide, N,N'-bis(3,5-di-tert-butyl-4-hydroxypenylpropionyl)hydrazide, N,N'-bis[2-(3,5-di-tert-butyl-4-hydroxyphenyl]-propionyloxy)ethyl]oxamide (Naugard® XL-1 by Uniroyal).

1.17 Ascorbic acid (vitamin C)

1.18 Amine-containing antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methyl-heptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methyl-heptyl)-N'-phenyl-p-phenylenediamine, N-cyclohexyl-N'-phenyl-p-phenylenediamine, 4-(p-toluenesulphamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naththylamine, N-(4-tert-octylphenyl)-1-naththylamine, N-phenyl-2-naphthylamine, octylated diphenylamine, for example p,p'-di-tert-octyl-diphenylamine, 4-n-butylaminophenol, 4-butyrylaminophenol, 4-nonanoylaminophenol, 4-dodecanoyl-aminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl diphenyl amines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyl diphenyl amines, 2,3-dihydro-3,3-dimethyl-4H-1,4-benzothiazine, phenothiazine, a mixture of mono- and dialkylated tert-butyl/tert-octyl phenothiazines, tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-ylhexamethylenediamine, bis(2,2,6,6-tetramethylpiperid-4-yl)sebacate, 2,2,6,6-tetramethylpiperidin-4-one, 2,2,6,6-tetra-methylpiperidin-4-ol. Individual compounds or mixtures thereof may be used.

1.19 Suitable thiosynergists include, for example, dilaurylthiodipropionate and/or distearylthiodipropionate.

2. UV-absorbers and light stabilisers may be used in quantities of 0.1 to 15 wt. %, preferably 3 to 8 wt. %, based on the mass of the composition, in the compositions according to the invention. Suitable UV absorbers and light stabilisers include, for example:

2.1 2-(2'-hydroxyphenyl)benzotriazoles, for example 2-(2'-hydroxy-5'-methylphenyl)benzotriazole, 2-(3',5'-di-tertbutyl-2'-hydroxyphenyl)-enzotriazole, 2-(5'-tert-butyl-2'-hydroxyphenylbenzotriazole, 2-(2'-hydroxy-5'-(1,1,3,3-tetramethylbutyl)phenyl)benzo-triazole, 2-(3',5'-di-tert-butyl-2'hydroxyphenyl)-5-chlorobenzo-triazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)-enzotriazole, 2-(3',5'-di-tert-amyl-2'-hydroxyphenyl)benzotriazole, 2-(3',5'-bis(α-α-dimethylbenzyl)-2'-hydroxyphenyl)benzotriazole, 2-(3'-tert-butyl-2'-hydroxy-5'-(2-octyloxycarbonyl-ethyl)phenyl)-5-chlorobenzotriazole, 2-(3'-tert-butyl-5'-[2-(2-ethyl-hexyloxy)carbonyl-ethyl]-2'-hydroxyphenyl)-5-chlorobenzotriazole, 2-(3'-tert-butyl-2'-hydroxy-5'-(2-meth-oxycarbony-ethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyl-oxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyl-oxycarbonylethyl)phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$, wherein R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl]benzotriazole.

2.2 2-hydroxybenzophenone, for example the 4-hydroxy-, 4-methoxy-, 4-octyloxy-, 4-decyloxy-, 4-dodecyloxy-, 4-benzyloxy-, 4,2',4'-trihydroxy- and 2'-hydroxy-4,4'-dimethoxy derivates.

2.3 Esters of substituted and unsubstituted benzoic acids such as, for example, 4-tert-butylphenylsalicylate, phenylsalicylate, octylphenyl-alicylate, bibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

2.4 Acrylates, for example ethyl-α-cyan-β,β-diphenylacrylate, isooctyl-α-cyan-β,β-diphenylacrylate, methyl-α-carbomethoxycinnamate, methyl-α-cyan-β-methyl-p-methoxycinnamate, butyl-α-cyan-β-methyl-p-methoxycinnamate, methyl-α-carbo-methoxy-β-methoxycinnamate and N-(β-carbomethoxy-β-cyanvinyl)-2-methylindoline.

2.5 Nickel compounds, for example nickel complexes of 2,2'-thiobis[4-(1,1,3,3-tetramethylbutyl)phenol], such as the 1:1 or 1:2 complex with or without additional ligands, such as n-butylamine, triethanolamine or N-cyclohexyldiethanolamine, nickel dibutyldithiocarbamate, nickel salts of monoalkylesters, for example of methyl or ethyl ester, of 4-hydroxy-3,5-di-tert-butylbenzylphosphonic acid, nickel complexes of ketoximes, for example of 2-hydroxy-4-methylphenylundecylketoxime, nickel complexes of 1-phenyl-4-lauroyl-5-hydroxypyrazole, with or without additional ligands.

2.6 Sterically hindered amines, for example bis(2,2,6,6-tetramethyl-4-piperidyl)sebacate, bis(2,2,6,6-tetramethyl-4-piperidyl)succinate, bis(1,2,6,6-pentamethyl-4-piperidyl)sebacate, bis(1-octyloxy-2,2,6,6-tetramethyl-4-piperidyl)sebacate, bis-(1,2,2,6,6-pentamethyl-4-piperidyl), n-butyl-3,5-di-tert-butyl-4-hydroxy-benzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl4-piperidyl)-1,2,3,4-butantetracarboxylate, 1,1'-(1,2-ethandiyl) bis-(3,3,5,5-tetramethylpiperazinone), 4-benzoyl-2,2,6,6-tetramethylpiperidine, 4-stearyl-oxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethyl-piperidyl) sebacate, bis(1-octyloxy-2,2,6,6-tetramethylpiperidyl)succinate, linear or cyclic condensates of N.N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butyl-amino-2,2,6,6-tetramethylpiperidyl)-1,3,5-triazine and 1,2-bis(3-aminopropyl-amino)ethane, the condensate of 2-chloro-4,6-bis(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)-pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperdine, a condensation product of N,N'-bis-(2,2,6,6-tetramethyl-4-piperidyl)hexamethylenediamine and 4-cyclohexylamino-2,6-dicloro-1,3,5-triazine, a condensation product of 1,2-bis(3-aminopropylamino)-ethane and 2,4,6-trichloro-1,3,5-triazine and 4-butylamino-2,2,6,6-tetramethylpiperdine (CAS Reg. No. [136504-96-6]); N-2,2,6,6-tetramethyl-4-piperidyl)-n-dodecyl-succinimide, N-(1,2,2,6,6-pentamethyl-4-piperdyl)-n-dodecyl-succinimide, 2-undecyl-7,7,9,9-tetramethyl-1-oxa-3,8-diaza-4-oxospiro[4.5]decane, a reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperdyl-oxycarbonyl)-2-(4-methoxyphenyl)ethene, N,N'-bis(formyl)-N,N'-bis(2,2,6,6-tetramethyl-4-piperidyl)-hexamethylenediamine, diesters of 4-methoxymethylene malonic acid with 1,2,2,6,6-pentamethyl-4-hydroxypiperidine, poly[methylpropyl-3-oxy-4-(2,2,6,6-tetramethyl-4-piperidyl)]siloxane, reaction product of malonic acid anhydride-α-olefin-copolymer with 2,2,6,6-tetramethyl-4-aminopiperidine or 1,2,2,6,6-pentamethyl-4-aminopiperidine.

2.7. Oxamide, for example 4,4'-dioctyloxyoxanilide, 2,2'-diethoxyoxanilide, 2,2'-di-octyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and the mixture thereof with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8 2-(2-hydroxyphenyl)-1,3,5-triazines, for example 2,4,6-tris(2-hydroxy-4-octyl-oxyphenyl)-1,3,5-triazine, 2-(2-hydroxy-4-octyloxyphenyl-4,6-bis(2,4-dimethylphenyl)

1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6,bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyl-oxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxy-phenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Individual compounds or mixtures thereof may be used.

3. Suitable metal deactivators include, for example, N,N'-diphenyloxamide, N-salicylal-N'-salicyloylhydrazine, N,N'-bis(salicyloyl)hydrazine, N,N'-bis(3,5-di-tert-butyl-4-hydroxyphenyl-propionyl)hydrazine, 3-salicyloyl-amino-1,2,4-triazole, bis(benzylidene)-oxalyldihydrazide, oxanilide, isophthaloyldihydrazide, sebacoylbisphenyl-hydrazide, N,N'-diacetyladipoyl-dihydrazide, N,N'-bis(salicyloyl)oxalyl-dihydrazide, N,N'-bis(salicyloyl)thiopropionyldihydrazide. Individual compounds or mixtures thereof may be used.

4. Suitable peroxide collectors include, for example, esters of β-thiodipropionic acid, for example lauryl, stearyl, myristyl or tridecyl esters, mercaptobenzimidazole or the zinc salt of 2-mercaptobenzimidazole, zinc dibutyldithiocarbamate, dioctadecyldisulphide, pentaerythritoltetrakis-(dodecylmercapto)propionate. Individual compounds or mixtures thereof may be used.

5. Suitable basic co-stabilisers include, for example, melamine, polyvinylpyrrolidone, dicyandiamide, triallylcyanurate, urea derivatives, hydrazine derivatives, amines, polyamides, polyurethanes, alkali metal salts, alkaline-earth metal salts of higher fatty acids, for example, calcium stearate, zinc stearate, magnesium behenate, magnesium stearate, sodium ricinoleate and potassium palmitate, antimony pyrocatecholate or zinc pyrocatecholate. Individual compounds or mixtures thereof may be used.

6. Suitable nucleating agents include, for example, inorganic substances such as talcum, metal oxides such as titanium dioxide or magnesium oxide, phosphates, carbonates or sulphates, preferably of alkaline-earth metals; organic compounds such as mono or polycarboxylic acids and salts thereof, for example 4-tert-butylbenzoic acid, adipic acid, diphenyl acetic acid, sodium succinate or sodium benzoate; polymeric compounds such as ionic copolymers (ionomers). 1,3:2,4-bis(3'4'-dimethylbenzylidene)sorbitol, 1,3:2,4-di(paramethyldibenzylidene)sorbitol and 1,3:2,4-di(benzylidene)sorbitol are particularly preferred. Individual compounds or mixtures thereof may be used.

7. Suitable fillers and reinforcing agents include, for example, calcium carbonate, silicates, glass fibres, glass balloon flasks, asbestos, talcum, kaolin, mica, barium sulphate, metal oxides and hydroxides, carbon black, graphite, wollastonite, sawdust and dust or fibres of other natural products, synthetic fibres. Individual compounds or mixtures thereof may be used.

8. Suitable further additives include, for example, plasticizers, lubricants, emulsifiers, pigments, viscosity modifiers, catalysts, flow control agents, optical brighteners, fire retardants, antistatic agents and blowing agents.

9. Suitable benzofuranones and indolinones include, for example, those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102, or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl-benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, lactone antioxidants such as

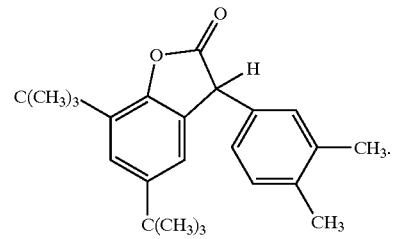

(8)

These compounds act, for example, as antioxidants. Individual compounds or mixtures thereof may be used.

10. Suitable fluorescing plasticizers are those listed in "Plastics Additives Handbook", edited by R. Gächter and H. Müller, Hanser Verlag, 3rd edition, 1990, pages 775–789.

11. Suitable flame-retardant additives include phosphate esters, i.e. triphenylphosphate, resorcinoldiphosphoric acid ester, bromine-containing compounds such as brominated phosphoric acids esters, brominated oligocarbonates and polycarbonates as well as salts such as $C_4F_9SO_3^- Na^+$.

12. Suitable toughening agents include butadiene rubber with grafted-on styrene acrylonitrile or methylmethacrylate, ethylene/propylene rubbers with grated-on maleic acid anhydride, ethyl and butyl acrylate rubbers with grafted-on methylmethacrylate or styrene acrylonitrile, interpenetrating siloxane and acrylate networks with grafted-on methylmethacrylate or styrene acrylonitrile.

13. Suitable polymers include SAN, ABS, PMMA, PTFE, PSU, PPS, polyolefins such as polyethylene, polypropylene and ethylene/propylene rubbers, epoxy resins, polyesters such as PBT, PET, PCT, PCTG and PETG as well as other polycarbonates produced by the interface process.

14. Suitable antistatic agents include sulphonate salts, for example tetraethylammonium salts of $C_{12}H_{25}SO^{3-}$ or $C_8F_{17}SO^{3-}$.

15. Suitable colorants include pigments as well as organic and inorganic dyes.

16. Epoxy group-containing compounds such as 3,4-epoxycyclohexylmethyl-3,4-epoxycyclohexylcarboxylate, copolymers of glycidyl methacrylate and epoxy silanes.
17. Compounds, the anhydride groups such as maleic acid anhydride, succinic acid anhydride, benzoic acid anhydride and phthalic acid anhydride.
18. Phosphites and phosphonites suitable as stabilisers include, for example, triphenylphosphite, diphenylalkylphosphites, tris(nonylphenyl)phosphite, trilaurylphosphite, trioctadecylphosphite, tristearylsorbittriphosphite, tetrakis(2,4-di-tert-butylphenyl)-4,4'-biphenylendiphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methylphosphite, bis-(2,4-di-tert-butyl-6-methylphenyl)ethylphosphite, 6-fluoro-2,4,8,10-tetra-tert-butyl-12-methyidibenz[d,g]-1,3,2-dioxaphosphocine, 2,2',2"-nitrilo[triethyltris(3,3', 5,5'tetra-tert-butyl-1,1'-biphenyl-2,2'-diyl)phosphite],2-ethyl-hexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane. Individual compounds or mixtures thereof may be used.

Tris(2,4-di-tert-butylphenyl)phosphite (Irgafos® 168, Ciba-Geigy) or triphenylphosphine are particularly preferred.

The compounds in groups 16 and 17 act as melt stabilisers. They may be used individually or in mixtures.

Of the aforementioned additives, the person skilled in the art will obviously select suitable additives which do not impair transparency for applications in the field of CD, DVD and other optical recording media.

IRGANOX 1076®, see above, and benzotriazoles from group 2.1 (so-called tinuvines), in particular mixed with one another are quite particularly suitable additives.

The polymer mixtures according to the invention are used in the manner know for polycarbonates for producing shaped articles, preferably optical media. In particular for producing compact discs and DVDs as well as optical media which may be written and erased one or more times. The writable layers consist, in particular, of dyes or metallic layers, the latter utilising the change from the amorphous state to the crystalline state as recording principle or having magnetic properties.

This production of the optical media preferably takes place from the ready-produced polymer mixtures according to the invention which occur, for example, as granules. However, the optical media may also be produced by incorporating the components in pure or conventional commercial polycarbonates and/or in the additives which are conventional during the production of shaped articles from polycarbonates.

The invention accordingly also relates to shaped articles such as, in particular, optical data carriers, preferably compact discs and DVDs which may be obtained from the thermoplastic polymer mixtures according to the invention.

The thermoplastic polymer mixtures according to the invention have the advantage that they possess better heat stability during the production of shaped articles, and the end products obtained (shaped articles) may easily be released from the production molds and do not leave impurities on the molds.

The following examples serve to illustrate the invention. The invention is not restricted to the examples.

EXAMPLES

Examples of polycarbonate produced by the phase interface process

The following mixtures were produced:

In accordance with the following Table the indicated amounts by weight of polycarbonate granules made of BPA-PC with terminal tert.-butylphenol groups, produced by the phase interface process and with an average solution viscosity of 1.195 (measured in methylene chloride at 25° C. and a concentration of 0.5 g in 100 ml methylene chloride) were mixed thoroughly with the indicated amounts by weight of glycerine monostearate and the indicated amounts by weight of phosphorus compound in a closed container. The mixture was then compounded on a twin-screw kneader of the Werner Pfleiderer ZSK 53 type at a mass temperature of about 240° C.

TABLE 1

(compositions)

| | Poly-carbonate | Glycerine mono-stearate | Phosphite 1 | Phosphite 2 |
|---|---|---|---|---|
| Example 1 | 99.955 | 0.04 | 0.005 | |
| Example 2 | 99.95 | 0.04 | 0.01 | |
| Comparison example 1 | 99.955 | 0.04 | | 0.005 |
| Comparison example 2 | 99.95 | 0.04 | | 0.01 |
| Comparison example 3 (without stabiliser) | 99.96 | 0.04 | 0 | 0 |

The product Loxiol EP 129 manufactured by Henke KgaA was used as glycerine monostearate. Phospite 1 is (2,4,6-tri-tert-butyl-phenyl)-(2-butyl-2-ethyl-propane-1,3-diyl)-phospite, which is available under the trade name Ultranox 641® from GE Specialty Chemicals. Phosphite 2 is tris(2, 4-di-tert-butylphenyl)phosphite, which is available from Ciba-Geigy as Irgafos® 168.

For measuring the product stability of CDs, CD blanks made of the above-described materials were then produced on a CD injection molding machine of the Netstal Discjet 600 type. The CDs had a thickness of 1.2 mm and an external diameter of 120 mm. The product stability was tested under various machine conditions, hereafter designated as setting 1 to 4:

Setting 1:
 Cylinder temperatures (feed/compression/cylinder head/nozzle) 315/320/320/320° C.; maximum injection rate: 130 mm/sec; mold (pre-run temperature): 55° C.; cycle time: 4.6 sec Setting 2:
 Cylinder temperatures (feed/compression/cylinder head/nozzle) 315/340/350/350° C.; maximum injection rate: 110 mm/sec; mold (pre-run temperature): 55° C.; cycle time: 4.9 sec Setting 3:
 Cylinder temperatures (feed/compression/cylinder head/nozzle) 315/360/380/380° C.; maximum injection rate: 100 mm/sec; mold (pre-run temperature): 55° C.; cycle time: 5.5 sec Setting 4:
 As setting 2, but the cycle was interrupted by a 5-minute stoppage of the machine. The fifth feed after each restart of the injection molding machine was taken for the following measurements.

The remaining glycerine monosteatate content and the phenolic OH group content were then determined on the CD blanks. The following results were obtained:
Table 2 (GMS Determinations)
(GMS concentrations in ppm in the CD under various conditions after production) high amounts on GMS indicates good heat stabilising effects and therefore less coating on the mounding instruments.

|  | Setting 1 | Setting 2 | Setting 3 | Setting 4 |
|---|---|---|---|---|
| Example 1 | 305 | 285 | 280 | 255 |
| Example 2 | 355 | 315 | 300 | 290 |
| Comparison example 1 | 290 | 270 | 255 | 195 |
| Comparison example 2 | 320 | 290 | 265 | 210 |
| Comparison example without heat stabiliser | 285 | 255 | 205 | 140 |

The concentration of phenolic OH in the CD was also measured under various conditions after production.
Table 3 (Measurements of Phenolic OH)
(Concentration of phenolic OH in ppm in the CD under various conditions after production) low OH means lower degree of destruction of the DC itself and better heatstoring stability of the moulded article.

|  | Setting 1 | Setting 2 | Setting 3 | Setting 4 |
|---|---|---|---|---|
| Example 1 | 120 | 130 | 130 | 140 |
| Example 2 | 105 | 120 | 125 | 130 |
| Comparison example 1 | 120 | 135 | 135 | 150 |
| Comparison example 2 | 120 | 135 | 140 | 150 |
| Comparison example 3 | 125 | 145 | 155 | 175 |

TABLE 4

(coating test)

|  | Coating formation |
|---|---|
| Example 1 | slight |
| Example 2 | slight |
| Comparison example 1 | slight |
| Comparison example 2 | moderate |
| Comparison example 3 | high |

Coating formation was determined as follows: to determine coatings in the mold, a thousand partially filled CD blanks were produced in each case on the CD injection molding machine of the Netstal Discjet 600 type with an Axxicon CD mold. The approx. 80% partial filling of the CDs was achieved by reducing the metering path and adapting the follow-up pressure. The cylinder temperatures were 300° C. in the feed zone and 310° C. in the compression zone, and a temperature of 330° C. prevailed at the cylinder head and at the nozzle. The cycle time was about 5.5 seconds. After the thousandth shot, the surface of the die and of the level in the outer region, i.e. the region which does not come into contact with the polycarbonate melt, was examined visually for coating formation. The foregoing results were obtained.

Examples of polycarbonate, produced by the melt transesterification process

In accordance with the following Table, the indicated amounts by weight of polycarbonate granules made of BPA-PC with terminal phenol groups, produced by the melt transesterification process and with an average solution viscosity of 1.200 (measured in methylene chloride at 25° C. and a concentration of 0.5 g in 100 ml methylene chloride) were mixed thoroughly with the indicated amounts by weight of glycerine monostearate and the indicated amounts by weight of phosphorus compound in a closed container. The mixture was then compounded on a twin-screw kneader of the Werner Pfleiderer ZSK 53 type at a mass temperature of about 240° C.

TABLE 1

(compositions)

|  | Polycarbonate | Glycerine monostearate | Phosphite 1 | Phosphite 2 |
|---|---|---|---|---|
| Example 1 | 99.06 | 0.03 | 0.01 |  |
| Comparison example 1 | 99.06 | 0.03 |  | 0.01 |
| Comparison example 2 (without stabiliser) | 99.07 | 0.03 |  |  |

The product Loxiol EP 129 manufactured by Henke KgaA was used as glycerine monostearate. Phospite 1 is (2,4,6-tri-tert-butyl-phenyl)-(2-butyl-2-ethyl-propane-1,3-diyl)-phospite, which is available under the trade name Ultranox 641® from GE Specialty Chemicals. Phosphite 2 is tris(2,4-di-tert-butylphenyl)phosphite, which is available from Ciba-Geigy as Irgafos® 168.

For measuring the product stability of CDs, CD blanks made of the above-described materials were then produced on a CD injection molding machine of the Netstal Discjet 600 type. The CDs had a thickness of 1.2 mm and an external diameter of 120 mm. The product stability is examined under machine setting 3 of the above-described processing programme.

The remaining glycerine monostearate content was then determined on the CD blanks. The following results were obtained:

TABLE 2

(GMS determinations)
(GMS concentrations in ppm in the
CD under various conditions after production)

|  | Setting 3 |
|---|---|
| Example 1 | 285 |
| Comparison example 1 | 195 |
| Comparison example 2 without heat stabiliser | 180 |

TABLE 3

(coating test)

|  | Coating formation (%) |
|---|---|
| Example 1 | 0.049 |
| Comparison example 1 | 0.099 |
| Comparison example 2 | 0.160 |

(Less coating show less disturbations of CD-functions)
Measurement of the Quantity of Condensate:

The quantity of condensate was determined by weighing an aluminium foil with and without coating. The quantity of coating is defined as follows:

Quantity of condensate in %=(weight of $film_{after\ measurement}$−$film_{before\ measurement}$)/sample weight*100%

Detailed Description of the Process:

After drying (120° C., 4 h) the 20 g granular material was poured into an aluminium dish having a diameter of 80 mm and a depth of 15 mm in such a way that the base of the dish is uniformly covered with granular material. The filled dish was introduced into a specifically provided sample chamber (85 mm diameter, 50 mm depth) of an electrically heatable metal block and was closed with an aluminium foil, 0.03 mm thick, 100 mm in diameter. To enable the volatile constituents to condense on the foil, the foil was cooled by a cooling plate during measurement. The temperature of the cooling water was adjusted to 20° C. When carrying out measurement, it should be ensured that the foil seals the sample chamber well from the exterior.

The metal block was heated to a temperature of 300° C. in a few minutes. The sample lasted for 4 h at this temperature and the test apparatus was then cooled to ambient temperature. After reaching ambient temperature, the aluminium foil was removed and weighed out on a microbalance and the quantity of condensate calculated according to the definition.

Detailed Description of Measurement Methods:

Glycerine Monostearate

The glycerine monstearate was separated on a capillary column by gas chromatography and detected using a flame ionisation detector. It was evaluated by the internal standard method. The determination limit was about 10 ppm.

Phenolic OH

The polycarbonate was dissolved in dichloromethane and reacted with titanium (IV) chloride to form an orangey red coloured complex of which the extinction was determined photometrically at 546 nm. Calibration was carried out using BPA as a external standard. The determination limit was about 20 ppm OH.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An optical data carrier comprising a thermoplastic molding composition comprising polycarbonate resin, at least one mold release agent and at least one phosphite selected from those conforming structurally to

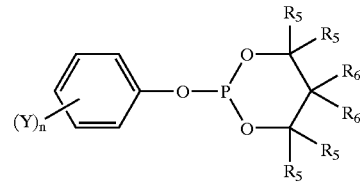

wherein $R_5$, independently of one another, are selected from the group consisting of hydrogen and $C_3$–$C_{20}$ alkyl, $R_6$ independently of one another represents $C_1$–$C_{10}$ alkyl, n is 0 to 5, and Y independently of one another represents alkyl or aryl group.

2. The optical data carrier of claim 1 wherein mold release agent is an ester of at least one polyhydric alcohol and $C_{16}$ to $C_{22}$ long-chain carboxylic acids, said ester containing at least one free OH group.

3. The optical data carrier of claim 1, wherein the mold release agent is a partial ester of saturated monohydric fatty acids containing 16 to 22 carbon atoms with at least one member selected from the group consisting of glycerine, trimethylol propane and pentaerythritol.

4. The optical data carrier of claim 1 wherein polycarbonate resin has a weight average molecular weight of 15,000 to 35,000.

5. The optical data carrier of claim 1 wherein mold release agent is present in an amount of 0.01 to 1.5 wt. % and wherein said phosphite is present in an amount of 0.001 to 0.1 wt. %, said percents, both occurrences being relative to the weight of said composition.

* * * * *